United States Patent
Iwata et al.

(10) Patent No.: US 7,584,693 B2
(45) Date of Patent: Sep. 8, 2009

(54) BOTTOMED CYLINDRICAL PISTON AND METHOD OF MANUFACTURING BOTTOMED CYLINDRICAL PISTON

(75) Inventors: Yukio Iwata, Tokyo (JP); Shigenori Matsumoto, Tokyo (JP); Fumio Takemori, Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 260 days.

(21) Appl. No.: 11/711,049

(22) Filed: Feb. 27, 2007

(65) Prior Publication Data
US 2007/0199774 A1    Aug. 30, 2007

(30) Foreign Application Priority Data
Feb. 28, 2006    (JP)    ............ P. 2006-053466

(51) Int. Cl.
*B23P 15/10* (2006.01)
*F16D 65/14* (2006.01)
(52) U.S. Cl. .............. 92/208; 29/888.044; 188/72.4
(58) Field of Classification Search .......... 92/168, 92/172; 29/888.04, 888.044, 888.049; 188/72.4, 188/152, 370
See application file for complete search history.

(56) References Cited

U.S. PATENT DOCUMENTS

| | | | | | |
|---|---|---|---|---|---|
| 3,476,221 | A | * | 11/1969 | Schanz | 92/172 |
| 3,532,030 | A | * | 10/1970 | Hugh | 29/888.04 |
| 4,193,179 | A | * | 3/1980 | Confer et al. | 29/888.04 |
| 4,506,768 | A | * | 3/1985 | Innocent | 92/168 |
| 5,105,917 | A | * | 4/1992 | Sporzynski et al. | 92/172 |
| 5,231,916 | A | * | 8/1993 | Weiler | 92/172 |
| 6,637,317 | B1 | * | 10/2003 | Zeibig et al. | 92/208 |
| 7,000,526 | B2 | * | 2/2006 | Bennett et al. | 92/172 |

FOREIGN PATENT DOCUMENTS

| | | |
|---|---|---|
| CN | 1179139 C | 12/2004 |
| JP | 51-92540 | 7/1976 |

* cited by examiner

*Primary Examiner*—Thomas E Lazo
(74) *Attorney, Agent, or Firm*—Drinker Biddle & Reath LLP (57) ABSTRACT

By forging a metal material, there is formed a dustproof boot 20 in which a side of an opening end portion 20*b* formed with a groove 34 for a dustproof boot is provided with a diameter smaller than that of a side of a piston main body 20*a*, and a total thereof is provided with a substantially uniform wall thickness, thereafter, by carrying out ironing from a front end of the opening end portion 20*b* to the piston main body side, the recess groove 34 for the dustproof boot can be formed by providing a build-up portion 20*c* at the opening end portion.

5 Claims, 9 Drawing Sheets

BEFORE PROCESSING → AFTER PROCESSING

BOTTOMED CYLINDRICAL PISTON AND METHOD OF MANUFACTURING BOTTOMED CYLINDRICAL PISTON

This application claims foreign priority from Japanese Patent Application No. 2006-053466, filed on Feb. 28, 2006, the entire contents of which are hereby incorporated by reference.

BACKGROUND OF THE INVENTION

1. Field of the Invention

The present invention relates to a method of forming a groove for a dustproof boot of a bottomed cylindrical piston formed with the dustproof boot at a vicinity of an opening end portion of the bottomed cylindrical piston formed by forging, and a piston manufactured by the method.

2. Related Art

Figure 8:
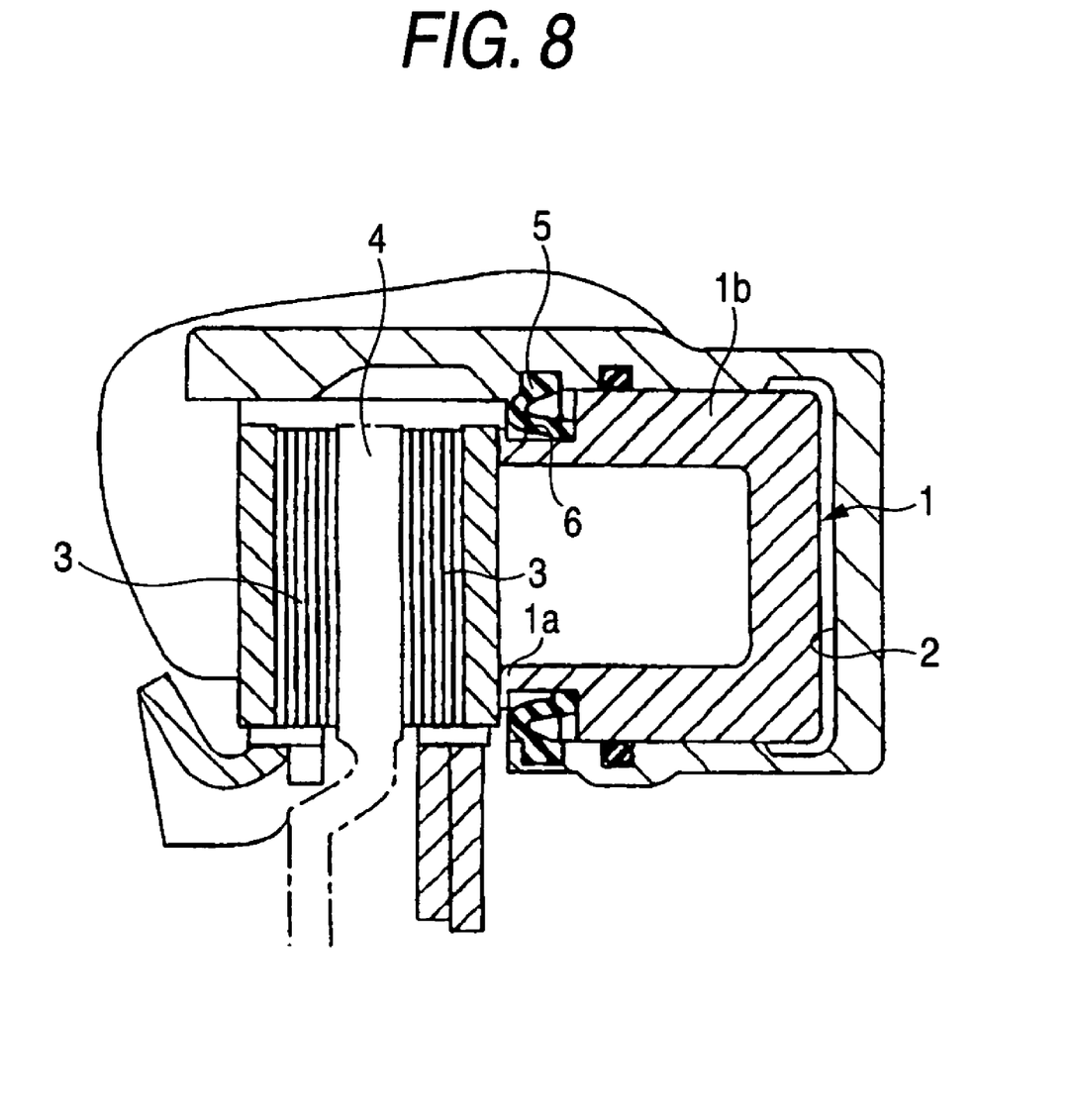
FIG. 8 is a sectional view of a disc brake including a bottomed cylindrical piston of a background art.

FIG. 8 shows an example of a bottomed cylindrical piston 1 of a disc brake of a background art. The disc brake is constituted to exert a brake force by extending an opening end portion 1a of the bottomed cylindrical piston 1 from an end portion of a hydraulic cylinder 2 to be butted to a friction pad assembly 3 and frictionally engaging the friction pad assembly 3 with a brake disc 4 by the bottomed cylindrical piston 1. However, invasion of dust or the like is remarkable at a portion thereof extended from the hydraulic cylinder 2. Therefore, a dustproof boot 5 is attached to the hydraulic cylinder 2 and a vicinity of the opening end portion 1a of the bottomed cylindrical piston 1. In order to attach the dustproof boot 5 to the vicinity of the opening end portion 1a, it is necessary to make a diameter on a side of the opening end portion 1a smaller than that of a piston main body side 1b. Normally, the vicinity of the opening end portion 1a is formed into a small diameter portion by cutting by a bit tool. After forming the small diameter portion by cutting in this way, a groove 6 for the dustproof boot is formed by cutting again. Therefore, there poses a problem of ensuring a wall thickness in view of a strength of the small diameter portion in order to form the groove 6 of the dustproof boot. In addition, there is a difficulty in which not only cost is increased since twice cutting is required but also a long working time period is taken. Further, there also poses a problem of bringing about a machining swarf.

Figure 9:
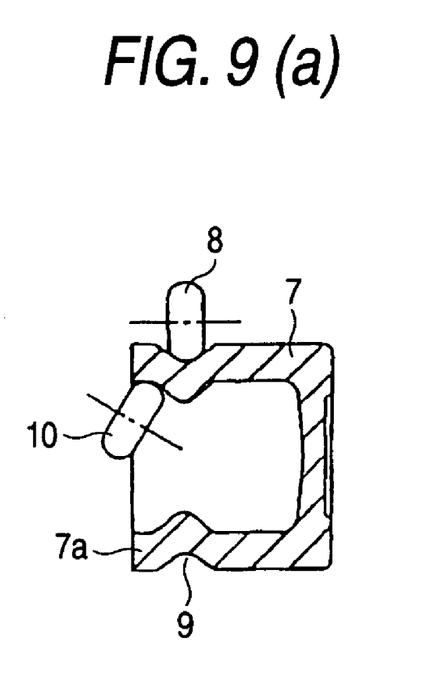
FIG. 9(a) is an outline view for explaining of forming a groove by a form rolling roll.
FIG. 9(b) is a sectional view of a bottomed cylindrical piston as a final product after forming the groove.

In order to avoid the method of forming the groove for the dustproof boot by cutting in this way, also a method by form rolling has already been developed (refer to, for example, JP-U-51-92540). FIG. 9(a) is an outline view for explaining of forming a groove by a form rolling roll, FIG. 9(b) is a sectional view of a bottomed cylindrical piston as a final product after forming the groove. As shown by FIG. 9 (a), at an opening end portion 7a of a bottomed cylindrical piston 7 formed from a steel block by forging, the bottomed cylindrical piston 7 is rotated while exerting an external force to a portion thereof slightly remote from an end face from an outer periphery thereof by a form rolling roll 8 to thereby form a recess portion 9 in a ring-like shape at an outer peripheral face of the bottomed cylindrical piston 7. At this occasion, a wall thickness in view of a strength thereof is ensured by restraining a reduction in a diameter of the opening end portion 7a by pressing a roll 10 also from a side of an inner peripheral face of the bottomed cylindrical piston 7. Further, as shown by FIG. 9(b), after forming the recess portion 9 in the ring-like shape, a recess groove 9a for attaching a dustproof boot is shaped by cutting the recess portion 9.

According to the method of forming the groove for the dustproof boot by form rolling of the background art described in JP-U-51-92540, although there is achieved an advantage of ensuring the wall thickness of the opening end portion of the bottomed cylindrical piston since cutting is not carried out in a procedure of forming the recess portion 9 in the ring-like shape, since the groove is fabricated by rotating the bottomed cylindrical piston 7, it takes a long working time period. In addition, after forming the recess portion 9, the recess groove 9a needs to be shaped by cutting, and the machining swarf is unavoidable.

SUMMARY OF THE INVENTION

One or more embodiments of the invention provide a method of forming a groove for a dustproof boot of a bottomed cylindrical piston capable of dispensing with a cutting process which causes an increase in cost by prolonging a working time period and bringing about the machining swarf, while ensuring a wall thickness of an opening end portion.

According to one or more embodiments of the present invention, in a first aspect, a bottomed cylindrical piston formed with a recess groove for the dustproof boot at an opening end portion is manufactured by: processing a metal material to be a bottomed cylindrical member by forging; processing an opening end of the bottomed cylindrical member by mouth-drawing so that a diameter of a side of the opening end portion is smaller than a diameter of a side of a piston main body and a total of the bottomed cylindrical member is provided with a substantially uniform wall thickness; and forming a build-up portion at the opening end portion by ironing from a front end of the opening end portion to the side of the piston main body, so that the recess groove for the dustproof boot is formed.

In a second aspect, at least one portion of the build-up portion may be formed with a notched portion connected with the recess groove for the dustproof boot.

In a third aspect, a split die may be set to a portion predetermined to form the recess groove for the dustproof boot before the ironing.

According to the first aspect, in forming the groove of the dustproof boot, a wall of the recess groove for the dustproof boot can be formed by moving an extra wall on the front end side of the opening end portion by the ironing. Therefore, cutting having a long working time period, amounting to an increase in cost and bringing about the machining swarf can be omitted, while ensuring the wall thickness of the opening end portion.

According to the second aspect, in assembling the disc brake, the dustproof boot can be restrained from being floated up by escaping sealed air produced when the bottomed cylindrical piston is pushed into the cylinder from the notch.

According to the third aspect, the groove for the dustproof boot can accurately be formed.

Further, according to one or more embodiments of the present invention, in a fourth aspect, a piston is provided with: a recess groove for the dustproof boot at an opening end portion of a bottomed cylindrical piston, wherein a diameter of a side of the opening end portion is smaller than a diameter of a side of a piston main body; and a build-up portion provided on a front end of the opening end portion and forming the recess groove between the build-up portion and the piston main body.

In a fifth aspect, the opening end portion maybe processed to have a small diameter by mouth-drawing.

In a sixth aspect, the build-up portion may be processed by ironing the front end of the opening end portion to the side of the piston main body.

In a seventh aspect, a wall thickness of the opening end portion may be substantially the same with a thickness of a wall thickness of the piston main body.

Other aspects and advantages of the invention will be apparent from the following description and the appended claims.

BRIEF DESCRIPTION OF THE DRAWINGS

FIGS. 6(a) and 6(b) illustrate explanatory views showing a modified example of the bottomed cylindrical piston of Embodiment 1.

FIGS. 9(a) and 9(b) illustrate sectional views of a bottomed cylindrical piston showing a method of forming a groove for a dustproof boot by form rolling in a background art.

DESCRIPTION OF REFERENCE NUMERALS AND SIGNS

20 . . . bottomed cylindrical piston
20a . . . piston main body portion
20b . . . opening end portion
20c . . . build-up portion
22 . . . caliper
24 . . . hydraulic cylinder
26, 27 . . . friction pads
28 . . . pressure plate
30 . . . brake disc
32 . . . dustproof boot
34 . . . recess groove for dustproof boot
36 . . . recess groove
38 . . . material
40 . . . recess die
42 . . . press die
44 . . . recess die
46 . . . press die
48 . . . punching machine
50a, 50b . . . upper and lower dies
52 . . . inner punch
54 . . . eject pin
56 . . . outer punch
58 . . . punching machine
60a, 60b . . . upper and lower dies
62 . . . inner punch
64 . . . eject pin
66 . . . outer punch
70 . . . bottomed cylindrical piston
70b . . . opening end portion
70c . . . build-up portion
72 . . . notched portion
74 . . . recess groove for dustproof boot
78 . . . punching machine
80a, 80b . . . upper and lower dies
82 . . . inner punch
84 . . . eject pin
86 . . . outer punch
88a, 88b . . . pair of split dies

DETAILED DESCRIPTION OF THE EXEMPLARY EMBODIMENTS

Exemplary Embodiments of the invention will be explained as follows.

Embodiment 1

Figure 1:
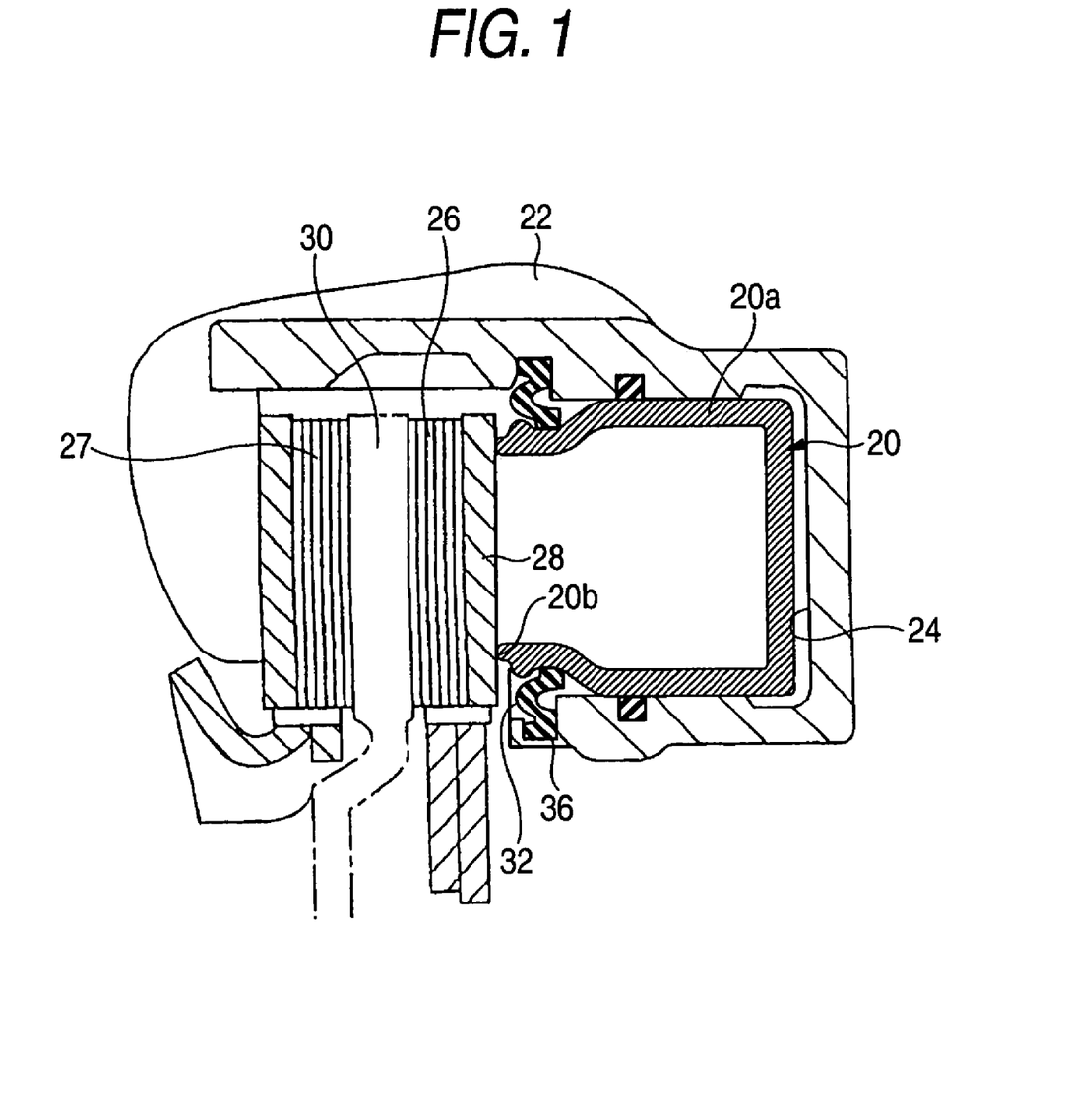
FIG. 1 is a sectional view of a disc brake including a bottomed cylindrical piston according to Embodiment 1 of the invention.
Figure 2:
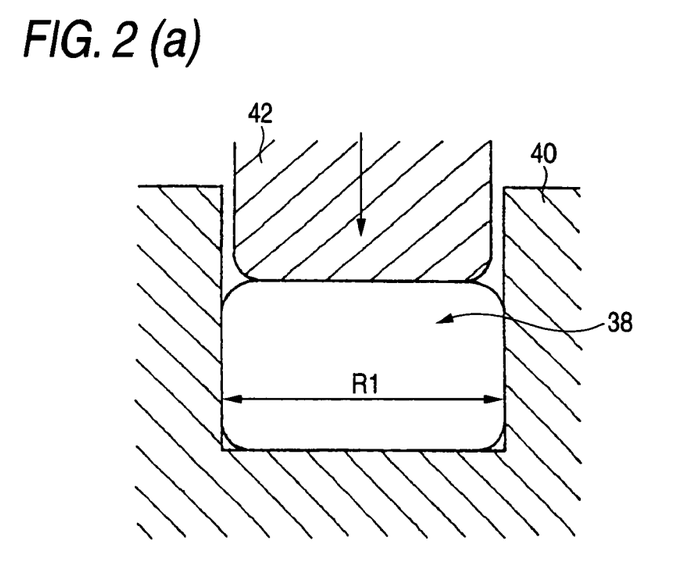
FIGS. 2(a) and 2(b) are sectional views showing a procedure of forming a bottomed cylindrical piston by forging.
Figure 3:
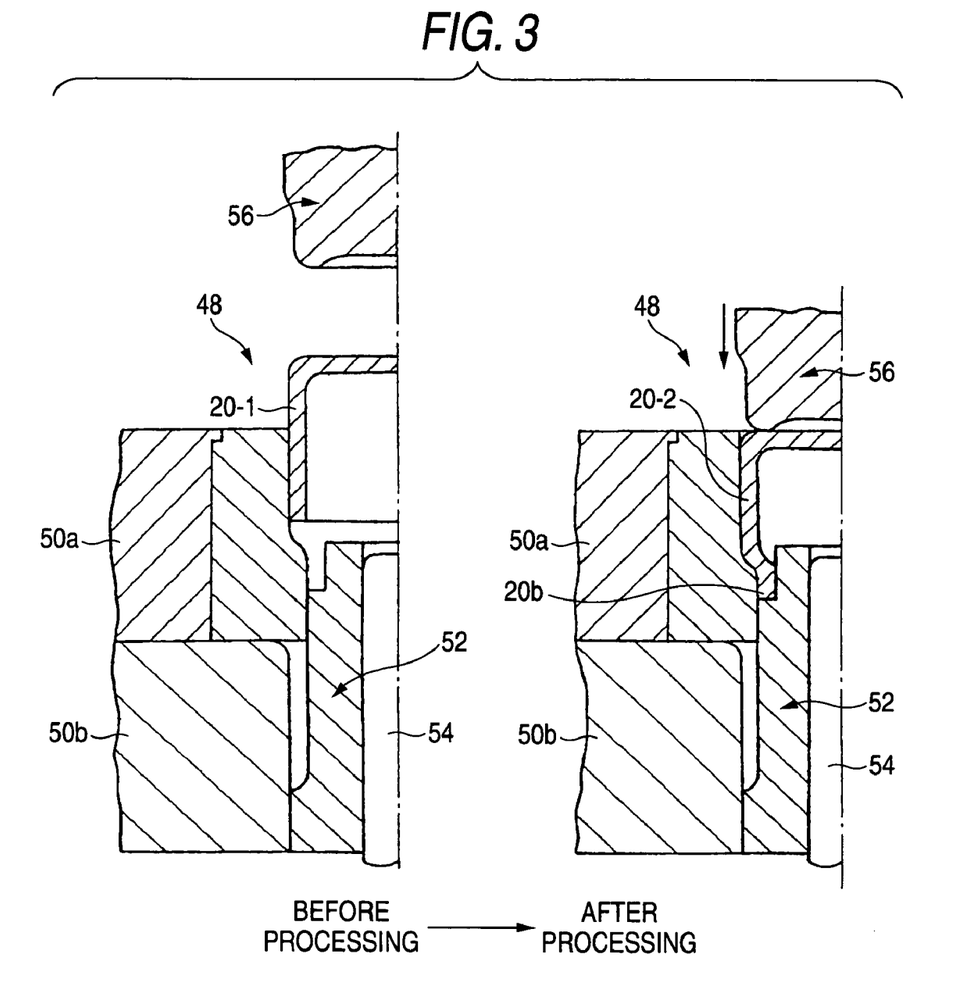
FIG. 3 is an outline view of a punching machine for forming an opening end portion side of a small diameter of a bottomed cylindrical piston (subjecting mouth-drawing).
Figure 4:
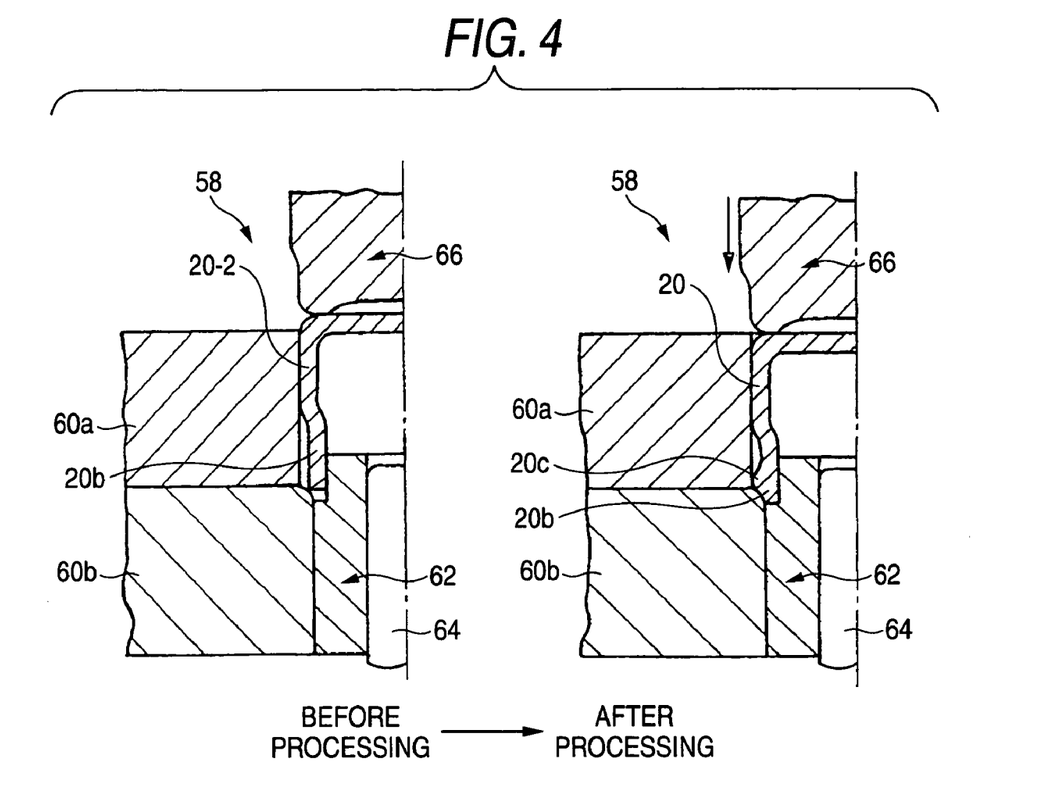
FIG. 4 is an outline view of the punching machine for forming a groove for a dustproof boot at a vicinity of an opening end portion.
Figure 5:
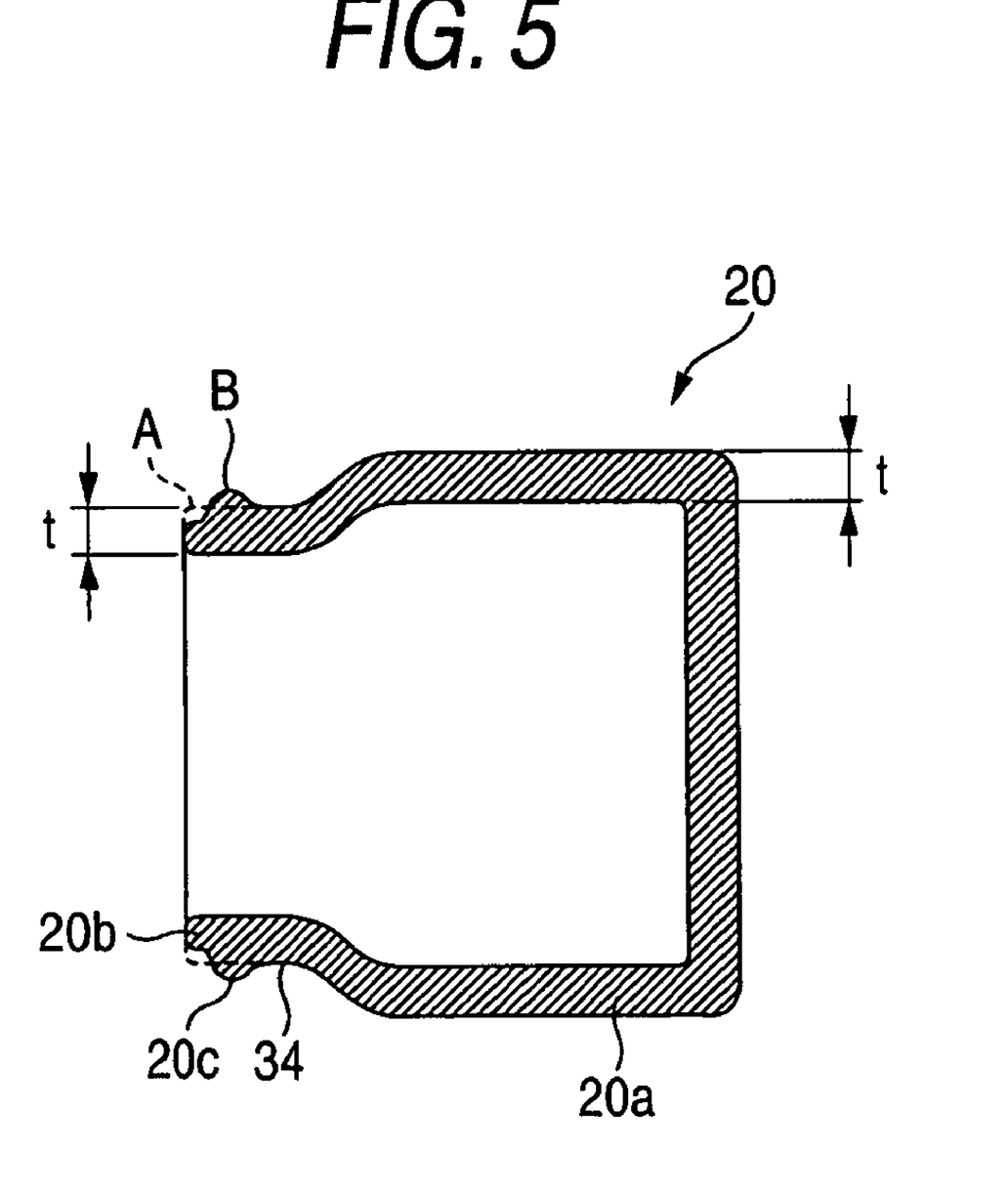
FIG. 5 is a sectional view of a bottomed cylindrical piston after manufacturing.

Embodiment 1 of the invention will be explained in reference to the drawings. FIG. 1 is a sectional view of a disc brake including a bottomed cylindrical piston according to Embodiment 1 of the invention, FIGS. 2(a) and 2(b) are sectional views showing a procedure of forming the bottomed cylindrical member by forging, FIG. 3 is an outline view of a punching machine for forming an opening end portion side of the bottomed cylindrical piston having a small diameter (subjecting a mouth-drawing), FIG. 4 is an outline view of a punching machine for forming a groove for a dustproof boot at a vicinity of the opening end portion, and FIG. 5 is a sectional view of the bottomed cylindrical piston after having been formed.

As shown by FIG. 1, a bottomed cylindrical piston 20 applied to a disc brake is slidably fitted to insert into a hydraulic cylinder 24 formed at a caliper 22, and is constituted by a piston main body portion 20a and an opening end portion 20b. When a brake hydraulic pressure is applied to the hydraulic cylinder 24, a braking operation is carried out by butting a front end side of the opening end portion 20b of the bottomed cylindrical piston 20 to a pressure plate 28 supporting a friction pad 26 on one side by operating the bottomed cylindrical piston 20 and pressing a brake disc 30 by a friction pad 27 on the other side by way of the caliper 22.

The front end side of the bottomed cylindrical piston 20 extended from an end portion of the hydraulic cylinder 24 is exposed to dust or the like, therefore, a dustproof boot 32 is mounted to between the hydraulic cylinder 24 and the opening end portion 20b of the bottomed cylindrical piston 20. The opening end portion 20b an outer shape dimension of which is made to be smaller than that of the piston main body portion 20a is formed with a recess groove 34 for the dustproof boot for receiving an inner end portion of the dustproof boot 32. The hydraulic cylinder 24 is formed with a recess groove 36 for receiving an outer end portion of the dustproof boot. The dustproof boot 32 is fitted to the two recess grooves 34, 36.

A method of forming a bottomed cylindrical piston 20-1 by forging will be explained in reference to FIGS. 2(a) and 2(b). As shown by FIG. 2(a), a carbon steel rod member cut to a predetermined length is inserted into a recess die 40 having an inner diameter of a length R1 the same as an outer diameter dimension of the bottomed cylindrical piston 20. The carbon steel rod member is pressed by a press die (punch) 42 under normal temperatures to thereby form a material 38 having smooth both ends. After subjecting the material 38 to an annealing treatment as necessary, as shown by FIG. 2(b), the material 38 is inserted into a recess die 44 having a shape the same as that of the recess die 40. Next, the bottomed cylindrical piston 20-1 having a substantially uniform wall thickness t over an entire portion thereof, an outer diameter dimension of R1 and an inner diameter dimension of R2 is obtained by extruding the material 38 by a press die (punch) 46 having a head portion dimension of a length R2 the same as that of the inner diameter dimension of the bottomed cylindrical piston 20.

Next, an explanation will be given of a method (mouth-drawing method) of forming the opening end portion 20b of a small diameter having a uniform wall thickness at the bottomed cylindrical piston 20-1 formed by forging. As shown by FIG. 3, a punching machine 48 is constituted by upper and lower dies 50a, 50b, and an inner punch 52, an eject pin 54 movable in an up and down direction at inside of the inner punch 52 fixed to a lower base and an outer punch 56 fixed to an upper base.

First, as shown by before processing of FIG. 3 (incidentally, only left half), the opening portion side of the bottomed cylindrical piston 20-1 is directed to a lower side and the opening end portion of the bottomed cylindrical piston 20-1 is brought into contact with inside of the upper and lower dies 50a, 50b. When a force directed to a lower side is exerted by the outer punch 56, the outer punch 56, the bottomed cylindrical piston 20-1 are moved down, as shown by after processing of FIG. 3 (incidentally, only left half), the front end portion of the bottomed cylindrical piston 20-1 is squeezed by the upper die 50a and the inner punch 52 and the opening end portion 20b having a diameter smaller than that of the piston main body portion 20a is formed by mouth deep drawing, and a bottomed cylindrical piston 20-2 having the opening end portion 20b of the small diameter is provided. Thereafter, by pushing up the eject pin 54, the bottomed cylindrical piston 20-2 is detached from the dies 50a, 50b to an upper side.

An explanation will be given of a method of forming the recess groove 34 for the dustproof boot for attaching the inner end portion of the dustproof boot 32 at the opening end portion 20b of the bottomed cylindrical piston 20-2 provided in this way in reference to FIG. 4. As shown by FIG. 4, a punching machine 58 for subjecting the opening end portion 20b of the bottomed cylindrical piston 20-2 to ironing is constituted by upper and lower dies 60a, 60b, an inner punch 62, an eject pin 64 movable in an up and down direction at inside of the inner punch 62 fixed to a lower base, and an outer punch 66 fixed to an upper base.

First, as shown by before processing of FIG. 4 (incidentally, only left half), when a side of the opening end portion 20b of the bottomed cylindrical piston 20-2 is directed to a lower side, the bottomed cylindrical piston is inserted into the upper and lower dies 60a, 60b to be fitted to the inner punch 62, and the outer punch 66 is exerted with a force directed to a lower side, the outer punch 66, the bottomed cylindrical piston 20-2 are moved down. Further, when moved down to a predetermined position, as shown by after working of FIG. 4 (incidentally, only left half), a front end portion of the opening end portion 20b of the bottomed cylindrical piston 20-2 is squeezed by the lower die 60b having the inner diameter smaller than an outer diameter of the opening end portion and the inner punch 62 and a build-up portion 20c is formed at the opening end portion 20b. By forming the build-up portion 20c by moving an extra wall on the front end side of the opening end portion 20b by ironing in this way, a wall of the recess groove 34 for the dustproof boot can be formed and the inner end portion of the dustproof boot 32 can be attached. Thereafter, by pushing up the left pin 64, the bottomed cylindrical piston 20 is detached from the dies 60a, 60b to an upper side.

According to the bottomed cylindrical piston 20 formed by the punching machine 58, as shown by FIG. 5, a front end portion A of the opening end portion 20b is moved to B by ironing, a wall thickness t of the opening end portion 20b and a wall thickness t of the piston main body portion 20a are substantially the same, and the opening end portion 20b is not reduced in view of the strength.

Figure 6:
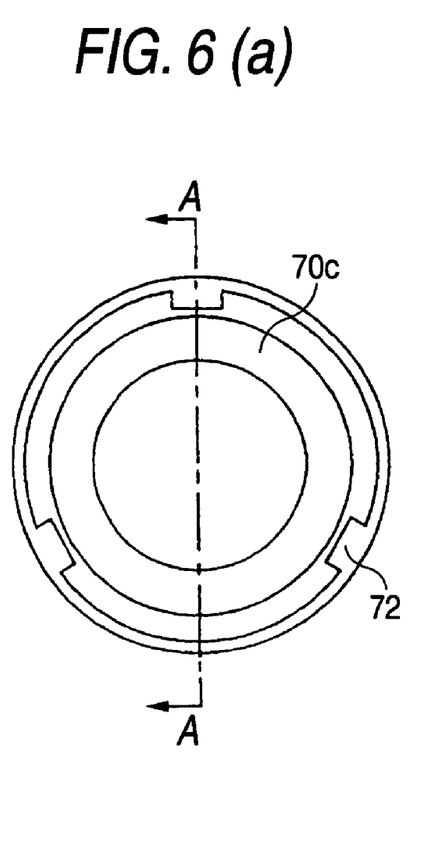
FIG. 6(a) is a front view of the bottomed cylindrical piston.
FIG. 6(b) is a sectional view taken along a line A-A of FIG. 6(a).

FIGS. 6(a) and 6(b) are explanatory views showing a modified example of the bottomed cylindrical piston of Embodiment 1, FIG. 6(a) is a front view of a bottomed cylindrical piston, and FIG. 6(b) is a sectional view taken along a line A-A of FIG. 6(a). As shown by FIGS. 6(a) and 6(b), a build-up portion 70c of a bottomed cylindrical piston 70 is notched at three portions in a circumferential direction, and a recess groove 74 for a dustproof boot is connected with outside. That is, the recess groove 74 is connected with an opening side of the opening end portion 70b by way of a notched portion 72.

Further, in assembling the drum brake or replacing a brake pad, when the bottomed cylindrical piston 70 is inserted into the hydraulic cylinder 24 in a state of being mounted with the dustproof boot 32, in a case in which an inner portion of the dustproof boot 32 is brought into a positive pressure state and the dustproof boot 32 is expanded to be going to be detached from the recess groove 74 for the dustproof boot, the recess groove 74 for the dustproof boot is connected with outside byway of the notched portion 72, and therefore, positive pressure air in the hydraulic cylinder 24 can be escaped from the notched portion 72 to outside, and the inner end portion of the dustproof boot 32 can be prevented from being detached from the recess groove 74 for the dustproof boot.

Embodiment 2

Figure 7:
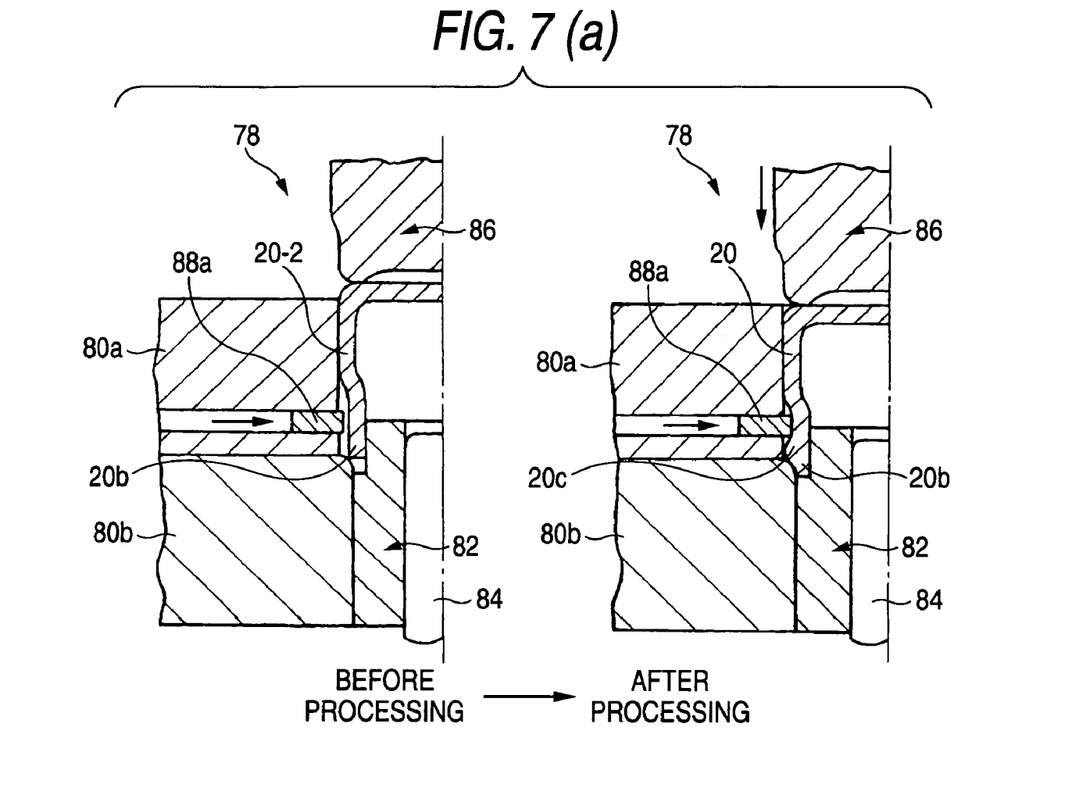
FIG. 7(a) shows Embodiment 2, and is a punching machine for carrying out ironing.
FIG. 7(b) is a plane view of a split die split into two.
FIG. 7(c) is a plane view of a split die split into three.

FIG. 7(a) shows Embodiment 2 and is a sectional view of a punching machine for carrying out ironing. FIG. 7(b) is a plane view of a split die split into two. As shown by FIG. 7(a), a punching machine 78 for carrying out ironing is constituted by upper and lower dies 80a, 80b, an inner punch 82, and an eject pin 84 movable in an up and down direction at inside of the inner punch 82 fixed to a lower base, and an outer punch 86 fixed to an upper base.

A portion of the upper dies 80a predetermined to form the groove for the dustproof boot is mounted with a pair of split dies 88a, 88b and these can be moved in a radius direction by a cam mechanism or the like. By mounting the pair of split dies 88a, 88b, the outer punch 86 and the bottomed cylindrical piston 20-2 are moved down, as shown by after processing of FIG. 7(a) (incidentally, only left half portion), a front end portion of the opening end portion 20b of the bottomed cylindrical piston 20-2 is squeezed by the lower die 80b having the inner diameter smaller than the outer diameter of the opening end portion and the inner punch 52 to thereby form the build-up portion 20c at the opening end portion 20b. In this case, by adjusting timings of forming the build-up portion 20c and moving the split dies 88a, 88b to an inner periphery, the groove for the dustproof boot can accurately be formed. Further, the split dies may be constituted by three or more pieces as shown by FIG. 7(c).

In this way, according to the invention, the groove for the dustproof boot is formed at the bottomed cylindrical piston by forging step, drawing step, ironing step, and therefore, cutting can be dispensed with while ensuring the wall thickness of the opening end portion, the working time period can be shortened, and the problem of bringing about the machining swarf can be resolved.

Although an explanation has been given of the Embodiments 1, 2 of the invention in reference to the drawings as described above, a specific constitution thereof is not limited to the embodiments. For example, although according to the exemplary embodiments, an explanation has been given by an example of applying to a disc brake, the invention is naturally applicable to a general piston operating apparatus having a dustproof boot. Further, it is preferable to subject the bottomed cylindrical piston having the groove for the dustproof boot provided as the final product to chemical plating or the like in accordance with object of use of preventing corrosion or promoting durability or the like.

Further, although an explanation has been given of an example of providing the build-up portion with the notched portions at the three portion in the circumferential direction as the modified example, it is preferable select to set a number or a size of the notched portions pertinently optimally.

What is claimed is:

1. A method of manufacturing a bottomed cylindrical piston, wherein the bottomed cylindrical piston is formed with a recess groove for the dustproof boot at an opening end portion, the method comprising:
   a forging step of processing a metal material to a bottomed cylindrical member by forging;
   a drawing step of processing an opening end of the bottomed cylindrical member by mouth-drawing so that a diameter of a side of the opening end portion is smaller than a diameter of a side of a piston main body and a total of the bottomed cylindrical member is provided with a substantially uniform wall thickness; and
   an ironing step of forming a build-up portion at the opening end portion by ironing from a front end of the opening end portion to the side of the piston main body, so that the recess groove for the dustproof boot is formed.

2. The method to according to claim 1, wherein at least one portion of the build-up portion is formed with a notched portion connected with the recess groove for the dustproof boot.

3. The method according to claim 1 or 2, wherein a split die is set to a portion predetermined to form the recess groove for the dustproof boot before the ironing step.

4. A disc brake apparatus comprising a piston manufactured in the method of claim 1.

5. A piston manufactured in the method of claim 1.

* * * * *